United States Patent
Godet

[11] 4,034,941
[45] July 12, 1977

[54] MAGNETIC ORIENTATION AND DAMPING DEVICE FOR SPACE VEHICLES

[75] Inventor: Sidney Godet, Little Falls, N.J.

[73] Assignee: International Telephone and Telegraph Corporation, Nutley, N.J.

[21] Appl. No.: 643,739

[22] Filed: Dec. 23, 1975

[51] Int. Cl.² .......................................... B64G 1/00
[52] U.S. Cl. .................................. 244/166; 310/93
[58] Field of Search .......... 244/166, 165, 164, 170, 244/3.21; 310/93

[56] References Cited
U.S. PATENT DOCUMENTS 3,162,396 12/1964 Rongved et al. ................... 244/166
3,399,317 8/1968 Davis ................................. 310/93

*Primary Examiner*—Trygve M. Blix
*Assistant Examiner*—Galen L. Barefoot
*Attorney, Agent, or Firm*—John T. O'Halloran; Alfred C. Hill

[57] ABSTRACT

A bar magnet is suspended by torsion wires and a ring inside a spherical frame rigidly attached to the space vehicle. The frame is filled with a damping fluid and damping domes are attached to each end of the bar magnet. The damping fluid and damping domes cooperate in damping or resisting angular motion between the bar magnet and the frame.

10 Claims, 2 Drawing Figures

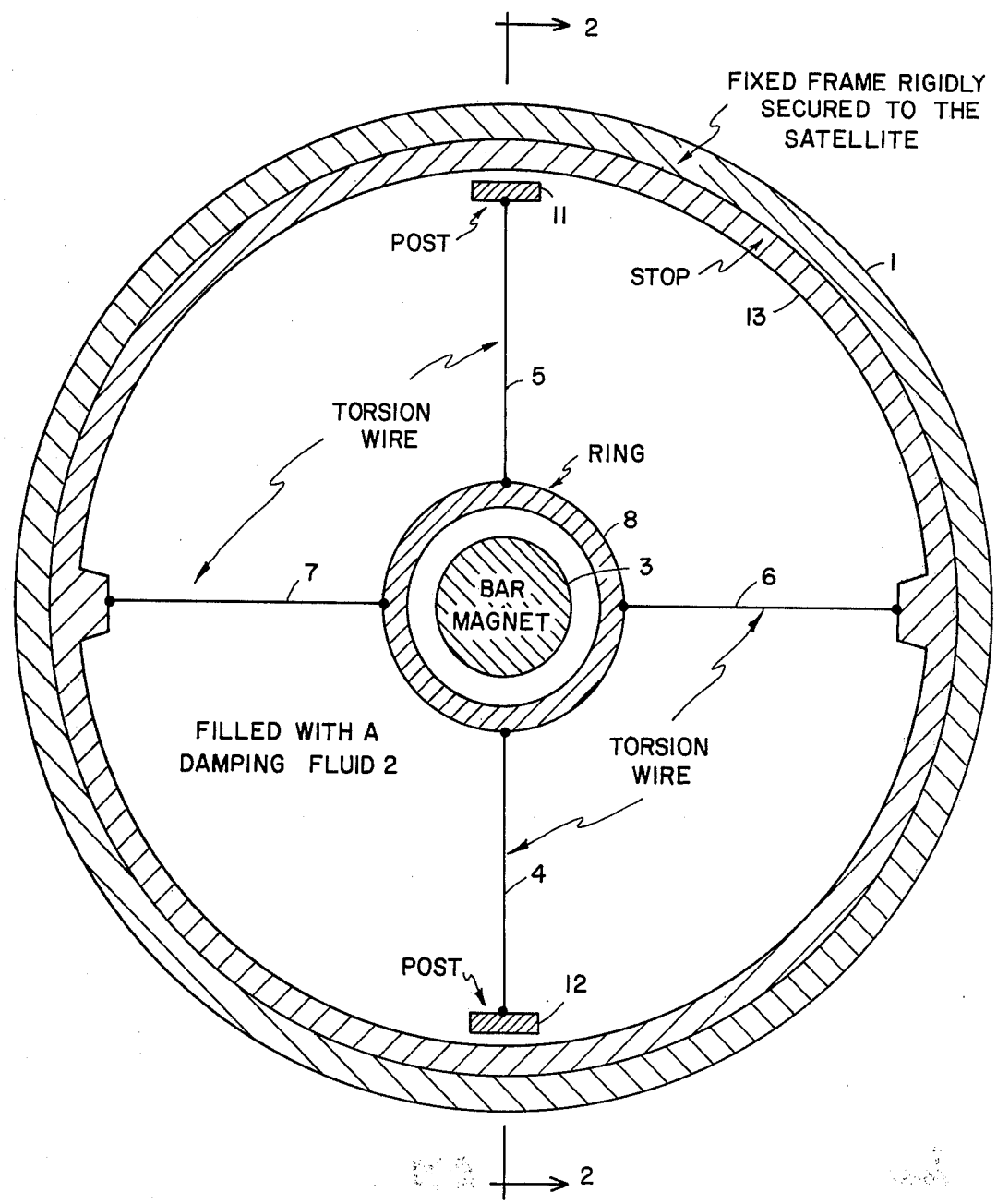

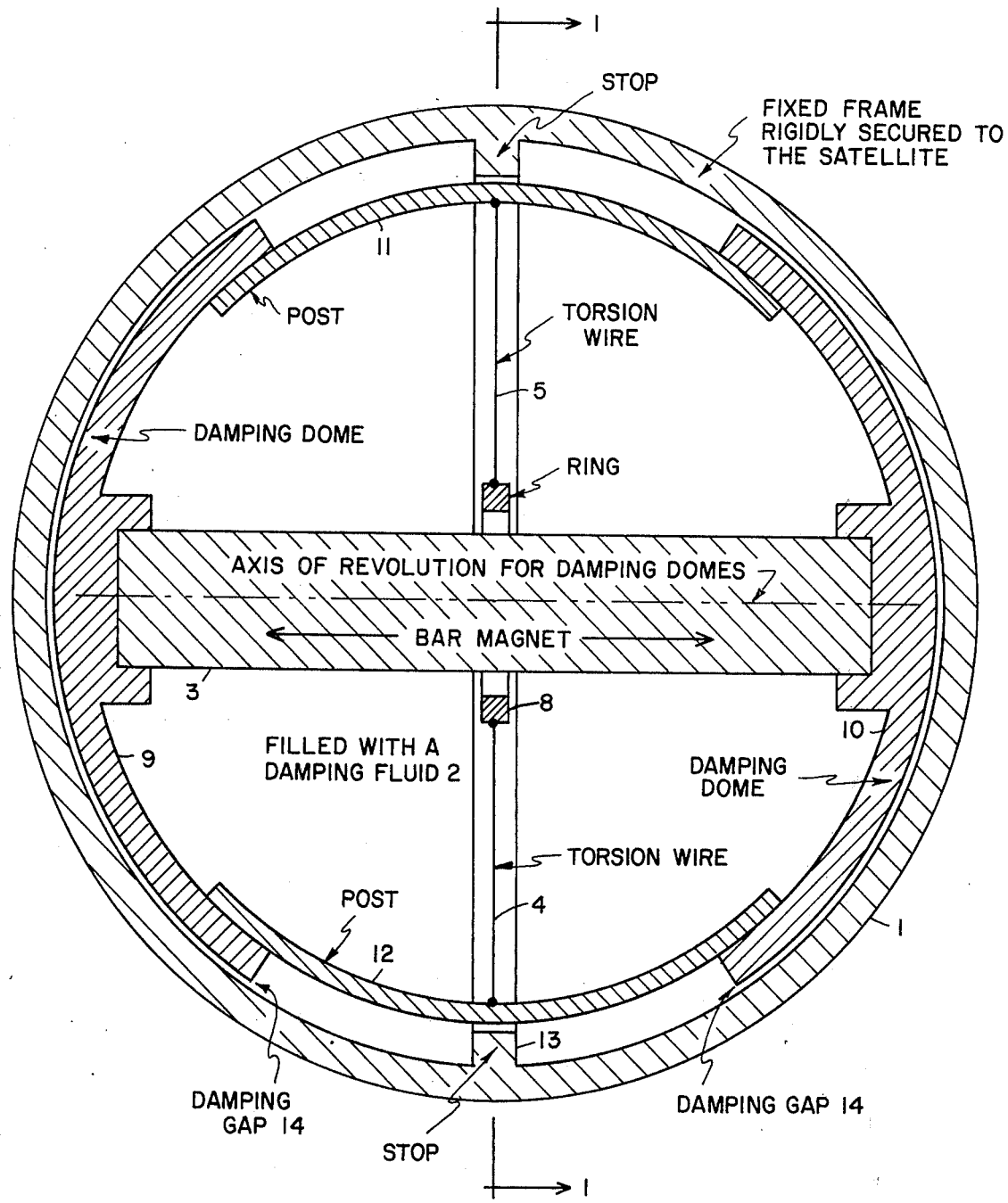

MAGNETIC ORIENTATION AND DAMPING DEVICE FOR SPACE VEHICLES

BACKGROUND OF THE INVENTION

This invention relates to orientation of a space vehicle and more particularly to a magnetic orientation and damping device for space vehicles.

In some application for space vehicles, such as a communications satellite, it is desirable to control a reference direction on the satellite to line up with the earth's magnetic field. This can be accomplished by carrying a bar magnet on the satellite whose axis represents the desired reference direction. The torque Q, in dyne centimeters (cm.), exerted on the bar magnet can be represented by the vector relationship:

$$\bar{Q} = \bar{M} \times \bar{H} \tag{1}$$

where $\bar{M}$ is the magnetic moment of the bar magnet, in pole - cm., and $\bar{H}$ is the intensity of the earth's magnetic field in oersteds.

If the bar magnet is rigidly attached to the satellite, and the rotation rate of the satellite has been reduced below some critical value, then the bar magnet will oscillate about the earth's magnetic field direction with a period $T_o$, given by $$T_o = 2\pi \sqrt{\frac{I}{MH}} \tag{2}$$

where $I$ is the moment of inertia of the satellite about the axis of interest, in grams cm.$^2$. If no damping means is provided, these oscillations will continue indefinitely with no decrease in amplitude.

In a prior satellite orientation control system, the above principles were employed with the addition thereto of a damping means. A bar magnet with a magnetic moment of 9000 pole-cm. was used, and damping was provided by means of hysteresis rods which generated losses as a result of the changing component of the earth's magnetic field in the rods.

A disadvantage of this prior arrangement was that the amount of damping torque generated was extremely small, so that the decay time constant was in the order of 5.5 hours, although the natural period $T_o$ was only a few minutes.

SUMMARY OF THE INVENTION

An object of the present invention is to provide a magnetic orientation and damping device for a space vehicle providing a decay time constant which is the same order of magnitude as the natural period $T_o$.

A feature of the present invention is the provision of a magnetic orientation and damping device for a space vehicle comprising: a fixed frame having at least a spherical inner surface rigidly secured to the vehicle; a damping fluid disposed within the frame; first means to suspend a bar magnet within the frame immersed in the fluid, the first means enabling the bar magnet to move with respect to the frame; and second means disposed within the frame immersed in the fluid secured to each end of the bar magnet and having at least an outer spherical surface spaced from the inner surface of the frame to dampen, in cooperation with the damping fluid, relative angular motion between the bar magnet and the frame.

BRIEF DESCRIPTION OF THE DRAWING

Above-mentioned and other features and objects of this invention will become more apparent by reference to the following description taken in conjunction with the accompanying drawing, in which:

FIG. 1 is a cross-section view taken along line 1—1 of FIG. 2 of a magnetic orientation and damping device in accordance with the principles of the present invention; and FIG. 2 is a cross-section view taken along line 2—2 of the device of FIG. 1.

DESCRIPTION OF THE PREFERRED EMBODIMENT

Referring to FIGS. 1 and 2 there is illustrated a magnetic orientation and damping device for a satellite in accordance with the principles of the present invention. The device includes a fixed spherical frame 1 rigidly attached to the satellite completely filled with a damping fluid 2. A bar magnet 3 is suspended in frame 1 by means of torsion wires 4, 5, 6 and 7 attached to an intermediate ring 8. The torsion wires 4, 5, 6 and 7 allow the axis of bar magnet 3 to move with respect to frame 1 up to a deviation of about 30° from the neutral position in any direction. The restoring torque gradient of torsion wires 4, 5, 6 and 7 would be about two or three times as large as the torque gradient of bar magnet 3 itself in its operating field.

Damping dome 9 having an outer spherical surface is secured to one end of bar magnet 3 and damping dome 10 having an outer spherical surface is secured to the other end of bar magnet 3. The outer spherical surfaces of domes 9 and 10 are less than a hemisphere. Domes 9 and 10 are connected together by two diametrically opposite support posts 11 and 12.

Ring 8 is supported between posts 11 and 12 by torsion wires 4 and 5 and between frame 1 by torsion wires 6 and 7 with torsion wires 6 and 7 being connected to ring 8 in a 90° relationship with the connecting points of torsion wires 4 and 5.

This support mechanism behaves like a spring restrained universal joint.

An annular boss on the inner surface of frame 1 serves as a stop 13 for the bar magnet support structure to prevent any damage or overstressing of torsion wires 4, 5, 6 and 7.

Relative angular motion between the bar magnet support and frame 1 is resisted by the cooperation of damping fluid 2, in which the entire bar magnet support is immersed, and damping domes 9 and 10. These domes move with respect to the spherical inner surface of frame 1 so that the damping gap 14 is a spherical shell.

Design parameters of the magnetic orientation and damping device of this invention will now be present with the symbols employed being defined as follows: $T_o$ and $I$ are previously defined, $U$ = ratio of torsion wire restraint gradient to the torque gradient of the bar magnet, $V$ = viscous coefficient of damping gap 14 in dyne cm. per radian/second, $T_D$ = decay time constant in seconds (time for amplitude of oscillation to decrease by a factor of e), $R_1$ = ratio of steady state error caused by an external torque, using the damping device, to the steady state error which would result from the same torque applied externally to a rigidly secured bar magnet, and $R_2$ = ratio of steady state error caused by an internal uncertainty torque in the damping device to the steady state error which would result from the same torque applied externally to a rigidly secured bar magnet.
Then:

$$R_1 = \frac{1+U}{U} \quad (3)$$

$$R_2 = \frac{1}{U} \quad (4)$$

The optimum value of V is $$V = \frac{2\pi I}{T_o}\left(\frac{U+1}{U+0.5}\right)\sqrt{U(U+1)} \quad (5)$$

For the optimum value of V $$T_D = \frac{2 T_o}{\pi}\sqrt{U(U+1)} \quad (6)$$

In some applications, the optimum value of V may be difficult to achieve practically because of limitations on the width of the damping gap 14 and on the viscosity of the damping fluid 2. For such cases, where V is small compared to the optimum value, the following approximate formula may be used:

$$T_D \approx 2 (I/V) (1 + U)^2 \quad (7)$$

From the above, a typical value of U, trading off steady state errors against decay time constant, would be about two. For $U = 2$, the various parameters are:

$$R_1 = 1.5, R_2 = 0.5, V \text{ (optimum)} = 2.94 \left(\frac{2\pi I}{T_o}\right)$$

For $V = V$ (optimum), $T_D = 1.56 T_o$

For a specific numerical example, consider the satellite employing the hysteresis rod system described under the heading "Background of the Invention", for which the appropriate parameters were: $I = 6.38 \times 10^5$ gram cm.$^2$, $M = 9000$ pole-cm., $H = 0.2$ oersteds and $T_o = 118.4$ seconds.

If the magnetic orientation and damping device of the present invention, with $U = 2$, had been used for the satellite rather than the hysteresis rod system, then $$V \text{ (optimum)} = 2.94 \frac{(2\pi \times 6.38 \times 10^5)}{118.4}$$

$$= 0.933 \times 10^5 \text{ dyne cm. per radian/sec}$$

$$T_D = 1.56 \times 118.4 = 185 \text{ seconds}$$

This value of $T_D$ should be compared with the 5.5 hours, or 19,800 seconds, achieved by the hysteresis rod system.

Even with a value of V as low as $10^4$ dyne cm. per radian/sec, the resultant $T_D$ would have been:

$$T_D = \frac{2 \times 6.38 \times 10^5 \times 9}{10^4}$$

$$= 1148 \text{ seconds}$$

which is still an improvement of 17 to 1 over the hysteresis rod system.

The magnetic orientation and damping device of the present invention is capable of providing relatively large damping torques. The manufacture of the device is straight forward and will require no critical adjustments. Since there are no sliding or rolling contacts between parts, there is nothing to wear out, and the device is extremely reliable. If the movable structure is fully floated in the damping fluid, then the stress on the torsion wires during launch can be made negligible, and no clamping device for launch would be required.

While I have described above the principles of my invention in connection with specific apparatus it is to be clearly understood that this description is made only by way of example and not as a limitation to the scope of my invention as set forth in the objects thereof and in the accompanying claims.

I claim:
1. A magnetic orientation and damping device for a space vehicle comprising:
   a fixed frame having at least a spherical inner surface rigidly secured to said vehicle;
   a damping fluid disposed within and completely filling said frame;
   first means to suspend a bar magnet within said frame, said first means enabling said bar magnet to move with respect to said frame, said first means and said bar magnet being completely immersed in and in contact with said fluid; and
   second means disposed within said frame completely immersed in said fluid secured to each end of said bar magnet and having at least an outer spherical surface spaced from said inner surface of said frame to dampen, in cooperation with said damping fluid, relative angular motion between said bar magnet and said frame.

2. A magnetic orientation and damping device for a space vehicle comprising:
   a fixed frame having at least a spherical inner surface rigidly secured to said vehicle;
   a damping fluid disposed within said frame;
   first means to suspend a bar magnet within said frame immersed in said fluid, said first means enabling said bar magnet to move with respect to said frame; and
   second means disposed within said frame immersed in said fluid secured to each end of said bar magnet and having at least an outer spherical surface spaced from said inner surface of said frame to dampen, in cooperation with said damping fluid, relative angular motion between said bar magnet and said frame;
   said second means including
      a first member secured to one end of said bar magnet having said outer spherical surface extending less than a hemisphere,
      a second member secured to the other end of said bar magnet having said outer spherical surface extending less than a hemisphere, and
      a pair of support posts diametrically disposed relative to each other to secure said first and second members together as a unit.

3. A device according to claim 2, wherein said first means includes
   a ring encircling said bar magnet,
   a first pair of torsion wires each connected between different ones of said posts and said ring, and
   a second pair of torsion wires disposed in a 90° relationship with said first pair of torsion wires and connected between said ring and diametrically disposed points of said frame.

4. A device according to claim 3, wherein said bar magnet is cylindrical.

5. A device according to claim 4, further including an annular boss formed in said inner surface of said frame to provide a stop for said first and second members to prevent damage or over-stressing of said first and second pairs of torsion wires.

6. A device according to claim 5, wherein said second pair of torsion wires are each connected between said boss and said ring.

7. A magnetic orientation and damping device for a space vehicle comprising:
   a fixed frame having at least a spherical inner surface rigidly secured to said vehicle;
   a damping fluid disposed within said frame;
   first means to suspend a bar magnet within said frame immersed in said fluid, said first means enabling said bar magnet to move with respect to said frame; and
   second means disposed within said frame immersed in said fluid secured to each end of said bar magnet and having at least an outer spherical surface spaced from said inner surface of said frame to dampen, in cooperation with said damping fluid, relative angular motion between said bar magnet and said frame;
   said first means including
   a ring encircling said bar magnet,
   a first pair of torsion wires connected between diametrically disposed points of said second means and said ring, and
   a second pair of torsion wires disposed in a 90° relationship with said first pair of torsion wires and connected between said ring and diametrically disposed points of said frame.

8. A device according to claim 7, wherein said bar magnet is cylindrical.

9. A magnetic orientation and damping device for a space vehicle comprising:
   a fixed frame having at least a spherical inner surface rigidly secured to said vehicle;
   a damping fluid disposed within said frame;
   first means to suspend a bar magnet within said frame immersed in said fluid, said first means enabling said bar magnet to move with respect to said frame;
   second means disposed within said frame immersed in said fluid secured to each end of said bar magnet and having at least an outer spherical surface spaced from said inner surface of said frame to dampen, in cooperation with said damping fluid, relative angular motion between said bar magnet and said frame; and
   an annular boss formed in said inner surface of said frame to provide a stop for said second means.

10. A device according to claim 9, wherein said bar magnet is cylindrical.

* * * * *